United States Patent [19]

Abodishish et al.

[11] Patent Number: 5,098,471

[45] Date of Patent: Mar. 24, 1992

[54] SEPARATION OF MAGNESIUM FROM MAGNESIUM CHLORIDE AND ZIRCONIUM AND/OR HAFNIUM SUBCHLORIDES IN THE PRODUCTION OF ZIRCONIUM AND/OR HAFNIUM SPONGE METAL

[75] Inventors: Hani A. M. Abodishish, Ogden; R. James Adams, West Point; Steven R. Kearl, Clearfield, all of Utah

[73] Assignee: Westinghouse Electric Corp., Pittsburgh, Pa.

[21] Appl. No.: 587,506

[22] Filed: Sep. 21, 1990

Related U.S. Application Data

[63] Continuation of Ser. No. 446,759, Dec. 6, 1989, abandoned.

[51] Int. Cl.⁵ .................... C22B 34/12; C22B 34/14
[52] U.S. Cl. ........................ 75/614; 75/618; 75/619
[58] Field of Search .................... 75/618, 619, 614

[56] References Cited

U.S. PATENT DOCUMENTS

| | | | |
|---|---|---|---|
| 3,966,460 | 6/1976 | Spink | 75/84.5 |
| 4,403,769 | 9/1983 | Ishizaka | 75/10.33 |
| 4,668,287 | 5/1987 | Kwon | 423/69 |
| 4,749,409 | 6/1988 | Ishizaka | 75/84.5 |

FOREIGN PATENT DOCUMENTS 2591235  6/1987  France .................... 75/618

Primary Examiner—Melvyn J. Andrews
Attorney, Agent, or Firm—J. C. Valentine

[57] ABSTRACT

Utilization of inherent fractional distillation of magnesium and magnesium chloride in reduction to sponge metal in a vacuum distillation furnace of zirconium and/or hafnium or other refractory metal tetrachloride by the Kroll process, to separate magnesium from magnesium chloride and metal subchlorides so the magnesium can be recycled in the process substantially free of the magnesium chloride and metal subchlorides. The magnesium vapor from the distillation furnace is recovered and condensed separately from the magnesium chloride and refractory metal sub-chloride vapors.

8 Claims, No Drawings

SEPARATION OF MAGNESIUM FROM MAGNESIUM CHLORIDE AND ZIRCONIUM AND/OR HAFNIUM SUBCHLORIDES IN THE PRODUCTION OF ZIRCONIUM AND/OR HAFNIUM SPONGE METAL

This application is a continuation of application Ser. No. 07/446,759 filed Dec. 6, 1989, abandoned.

BACKGROUND OF THE INVENTION

1. Field of the Invention:

The invention has to do with the production of zirconium and/or hafnium or other refractory sponge metal by use of the well known Kroll process for reducing zirconium and/or hafnium or other metal tetrachloride, such as titanium or uranium, wherein magnesium metal is used as the reducing agent and magnesium chloride is generated as a result of the reaction.

2. Description of the Prior Art:

In the production of zirconium and/or hafnium sponge metal using the Kroll process, it is customary to condense and recirculate magnesium metal that is distilled off as a vapor from the vacuum distillation furnace. However, vaporized magnesium chloride and zirconium and/or hafnium sub-chlorides are inevitably condensed and recirculated with the magnesium, which is undesirable since a bad quality sponge metal that is more susceptible to catching fire is produced, time for moisture removal from the charged materials is increased, and available volume in the furnace is reduced. It is only necessary to recycle the magnesium.

SUMMARY OF THE INVENTION

In the making of the present invention, it was a principal objective to eliminate the undesirable recycling of the magnesium chloride and of the zirconium and/or hafnium sub-chloride.

A feature of the invention in the accomplishment of this objective, is the recognition that the magnesium and the magnesium chloride and the zirconium and/or hafnium sub-chlorides are fractionally distilled in the distillation furnace and can be recovered separately so that only the magnesium need be recycled.

In accordance with the invention, the volatilized magnesium is collected and condensed in one condenser and the magnesium chloride and zirconium and/or hafnium sub-chlorides are collected and condensed in a second condenser. Only the magnesium recovered in the first condenser is recycled in the process.

DETAILED DESCRIPTION OF THE BEST MODE

The best mode presently contemplated for carrying out the invention is to carry out distillation of the sponge metal intermediate product in the usual vacuum distillation furnace but to take off the distillation vapor of the magnesium separately from the distillation vapors of the magnesium chloride and of the zirconium and/or hafnium subchlorides and to pass the former into one condenser and the latter into a second condenser for condensation separately.

The usual distillation cycle carried out in the vacuum furnace is as follows:

| Temp. (°C.) | Time (Hrs.) | Vacuum mm (micron) Hg |
|---|---|---|
| 300 | 24 | (50) |
| 450 | 22 | (50) |
| 750 | 10 | (50) |
| 900 | 30 | (100) |
| 960 | 24 | 100 |
| 1040 | 16 | (50) |

In the present process, the volatilized magnesium and the volatilized magnesium chloride together with the zirconium and/or hafnium sub-chlorides are recovered and condensed in separate condensers located at the bottom of the furnace. The magnesium is recycled to the reduction run of the process.

In accordance with the invention, calculation of the comparative vapor pressures of the magnesium and the magnesium chloride has shown that there is sufficient differential between them that, under the vacuum and temperature conditions in the usual vacuum furnace, separation can be accomplished by making use of the fractional distillation that takes place in the furnace. Magnesium will volatilize first, followed by magnesium chloride and by the sub-chlorides. Accordingly, drawing off of the magnesium vapor separately from the vapors of the magnesium chloride and the sub-chlorides and condensing them separately will enable pure magnesium to be recycled indefinitely.

Since the zirconium and/or hafnium sub-chlorides vaporize under temperature and vacuum conditions relatively close to those of magnesium chloride, the vapors of both can be drawn off together and condensed together in the same condensor.

It is preferred to draw off the magnesium vapor at a furnace temperature in the range of from about 800° C. to about 850° C., at which temperatures the vapor pressure of magnesium ranges between about 24.5 mm Hg. and about 48 mm Hg. and the vapor pressure of the magnesium chloride ranges between about 2.1 and 4.6 mm Hg.

In testing the process of the invention, one of the regular vacuum distillation furnaces at the plant of Western Zirconium Co. (Westinghouse Electric Corporation), Ogden, Utah, was charged with 2,240 lbs. net of a mixture of magnesium, magnesium chloride, and zirconium sub-chloride in a stainless steel liner. The liner was placed in the furnace and the furnace was evacuated in accordance with normal procedure. The following heat and vacuum cycle was applied:

| Temp. (°C.) | Time (Hrs.) | Vacuum |
|---|---|---|
| 300 | 24 | 50 Mircons Hg. |
| 450 | 22 | 50 Microns Hg. |
| 750 | 10 | 55 Torr Hg. |
| 850 | 20 | 55 Torr Hg. |

The vaporized magnesium and the vaporized magnesium chloride and zirconium sub-chloride were drawn off separately into separate condensers, with the result that 1,680 lbs. of pure magnesium were recovered in one of the condensers and 560 lbs. of magnesium chloride and chloride and zirconium sub-chloride were recovered in the other condenser.

In accordance with the invention, magnesium metal of purity ranging from 96-98% can be recycled, without the need for installing an expensive magnesium melting facility for separation purposes.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim as our invention:

1. In the producing of a refractory metal wherein a sponge refractory metal is produced as an intermediate product by the use of magnesium with the incidental production of magnesium chloride, and wherein residual magnesium is separated from the magnesium chloride and from refractory metal sub-chlorides by subjecting said sponge refractory metal to a vacuum distillation step which fractionally distills the magnesium, the magnesium chloride, and the metal sub-chlorides; the steps of: recovering fractionally distilled vapors of magnesium chloride and metal sub-chlorides from a sponge refractory metal; separately condensing the vapors as separately recovered; and recycling the separately recovered magnesium at a purity of at least about 96%.

2. A process according to claim 1, wherein the recovered magnesium is condensed from a vapor provided at a temperature of from about 800° C. to about 850° C.

3. In a process for producing a refractory metal by the reduction of a tetrachloride of said refractory metal by means of magnesium, a refractory metal sponge being produced as an intermediate product with the incidental production of magnesium chloride, and wherein the metal sponge is subjected to distillation for removing therefrom residual magnesium and the magnesium chloride, the improvement comprising: fractionally distilling magnesium vapor and magnesium chloride vapor from a refractory metal sponge recovering the magnesium vapor independently of the fractionally distilled magnesium chloride vapor; condensing the magnesium vapor as magnesium metal; and recycling said magnesium metal to the reduction step at a purity of 96-98%.

4. A process according to claim 3, wherein the magnesium is recovered and condensed from a vapor distilled at a temperature of from about 800° C. to about 850° C.

5. A process according to claim 4, wherein the magnesium is recovered from a vapor distilled at a temperature of 850° C.

6. A process according to claim 3, wherein the refractory metal sponge is zirconium.

7. A process according to claim 3, wherein the refractory metal sponge is hafnium.

8. A process according to claim 3, wherein the refractory metal sponge is titanium.

* * * * *